United States Patent
Li et al.

(10) Patent No.: US 10,816,717 B2
(45) Date of Patent: Oct. 27, 2020

(54) BACKLIGHT MODULE, DISPLAY DEVICE AND TERMINAL

(71) Applicants: BOE Technology Group Co., Ltd., Beijing (CN); Beijing BOE Chatani Electronics Co., Ltd., Beijing (CN)

(72) Inventors: Qilin Li, Beijing (CN); Guowei Li, Beijing (CN); Tengfei Lou, Beijing (CN)

(73) Assignees: BOE Technology Group Co., Ltd., Beijing (CN); Beijing BOE Chatani Electronics Co., Ltd., Beijing (CN)

(*) Notice: Subject to any disclaimer, the term of this patent is extended or adjusted under 35 U.S.C. 154(b) by 0 days.

(21) Appl. No.: 16/547,683

(22) Filed: Aug. 22, 2019

(65) Prior Publication Data
US 2020/0064542 A1    Feb. 27, 2020

(30) Foreign Application Priority Data

Aug. 27, 2018    (CN) .................... 2018 2 1391137 U

(51) Int. Cl.
*F21V 8/00*    (2006.01)

(52) U.S. Cl.
CPC .................. *G02B 6/0088* (2013.01)

(58) Field of Classification Search
CPC .................................................. G02B 6/0088
See application file for complete search history.

(56) References Cited

U.S. PATENT DOCUMENTS

| | | | | |
|---|---|---|---|---|
| 2002/0114152 | A1* | 8/2002 | Fujino | G02B 6/0088 362/628 |
| 2006/0092661 | A1* | 5/2006 | Inoue | G02B 6/0031 362/600 |
| 2007/0019440 | A1* | 1/2007 | Fang | G02B 6/0088 362/633 |
| 2007/0115691 | A1* | 5/2007 | Yu | G02B 6/0091 362/632 |
| 2009/0033827 | A1* | 2/2009 | Chen | G02B 6/0088 349/58 |
| 2012/0236207 | A1* | 9/2012 | Fukuda | H04N 5/64 348/725 |
| 2013/0044275 | A1* | 2/2013 | Yu | G02B 6/0088 349/62 |
| 2013/0258236 | A1* | 10/2013 | Zhang | G02B 6/0088 349/60 |
| 2015/0277125 | A1* | 10/2015 | Hirano | G02B 6/0088 359/633 |
| 2017/0343721 | A1* | 11/2017 | Takada | G02B 6/0013 |
| 2018/0113252 | A1* | 4/2018 | Lee | G02B 6/00 |

* cited by examiner

*Primary Examiner* — Donald L Raleigh
(74) *Attorney, Agent, or Firm* — Fay Sharpe LLP

(57) ABSTRACT

The present disclosure discloses a backlight module, a display device and a terminal, in the field of display technology. The backlight module includes a back plate, a light guide plate and at least one elastic mechanism. The back plate includes a base plate and a lateral plate. The light guide plate is stacked on the base plate. The elastic mechanism is between a side surface of the light guide plate and the lateral plate, and the elastic mechanism is connected to the side surface of the light guide plate and the lateral plate.

15 Claims, 12 Drawing Sheets

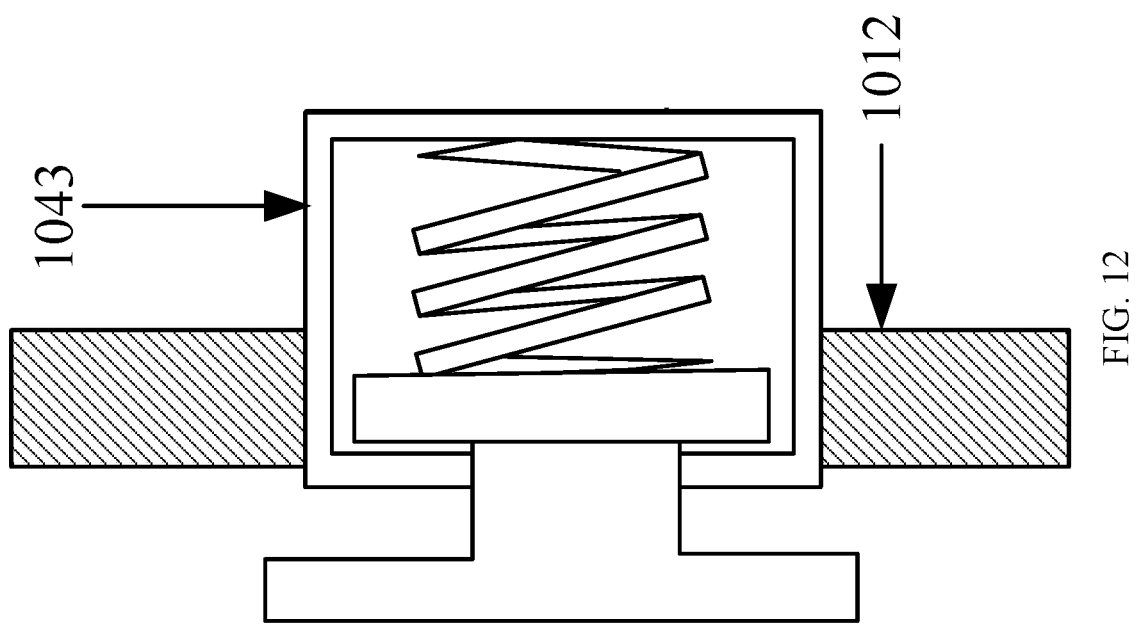

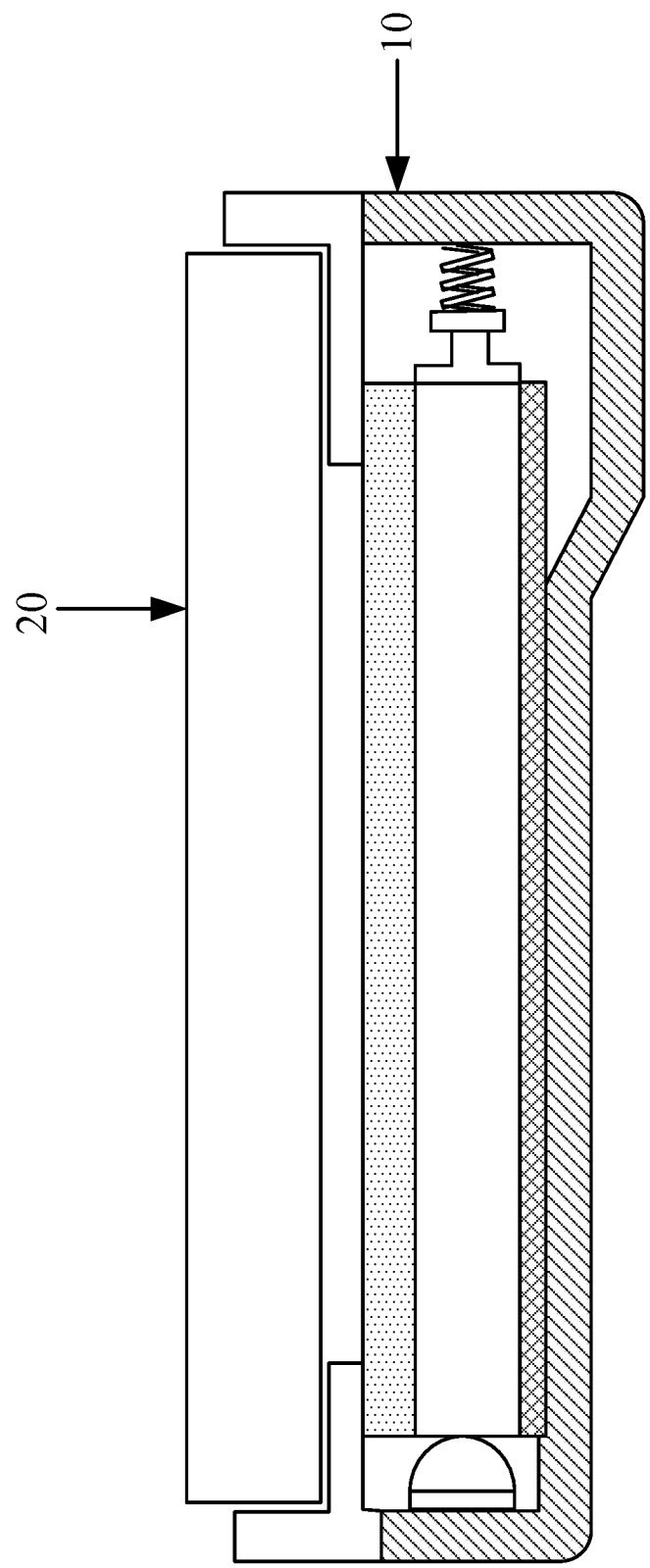

BACKLIGHT MODULE, DISPLAY DEVICE AND TERMINAL

This application claims priority to Chinese Patent Application No. 201821391137.4, filed on Aug. 27, 2018 and entitled "BACKLIGHT MODULE, DISPLAY DEVICE AND TERMINAL", the entire contents of which are incorporated herein by reference.

TECHNICAL FIELD

The present disclosure relates to the field of display technology, and in particular to a backlight module, a display device and a terminal.

BACKGROUND

A liquid crystal display includes a liquid crystal display panel and a backlight module disposed at the back of the liquid crystal display panel. The backlight module usually includes a light guide plate. Currently, the light guide plate is generally prepared from polymethyl methacrylate (PMMA).

The light guide plate prepared from PMMA expands when it is heated. Currently, during designing a back light module, gaps are generally reserved outside four side surfaces of the light guide plate to adapt to an expansion amount of the light guide plate. Thus, the reliability of the backlight module is guaranteed.

SUMMARY

Embodiments of the present disclosure provide a backlight module, a display device and a terminal. The technical solutions are as follows.

According to an aspect of the present disclosure, there is provided a backlight module, comprising a back plate, a light guide plate and at least one elastic mechanism; wherein the back plate comprises a base plate and a lateral plate, the light guide plate being stacked on the base plate, and the lateral plate being outside a side surface of the light guide plate, the side surface of the light guide plate being a surface other than two relatively bigger surfaces of the light guide plate; and the at least one elastic mechanism is between the side surface of the light guide plate and the lateral plate, and each elastic mechanism is connected to the side surface of the light guide plate and the lateral plate.

According to another aspect of the present disclosure, there is provided a display device, comprising a backlight module, wherein the backlight module comprises a back plate, a light guide plate and at least one elastic mechanism, wherein the back plate comprises a base plate and a lateral plate, the light guide plate being stacked on the base plate, and the lateral plate being outside a side surface of the light guide plate, the side surface of the light guide plate being a surface other than two relatively bigger surfaces of the light guide plate; and the at least one elastic mechanism is between the side surface of the light guide plate and the lateral plate, and each elastic mechanism is connected to the side surface of the light guide plate and the lateral plate.

According to yet another aspect of the present disclosure, there is provided a terminal, comprising a display device, the display device comprising a backlight module, wherein the backlight module comprises a back plate, a light guide plate and at least one elastic mechanism; wherein the back plate comprises a base plate and a lateral plate, the light guide plate being stacked on the base plate, and the lateral plate being outside a side surface of the light guide plate, the side surface of the light guide plate being a surface other than two relatively bigger surfaces of the light guide plate; and the at least one elastic mechanism is between the side surface of the light guide plate and the lateral plate, and each elastic mechanism is connected to the side surface of the light guide plate and the lateral plate.

BRIEF DESCRIPTION OF THE DRAWINGS

FIG. 12 shows a schematic diagram illustrating another connection between an encapsulation housing and a lateral plate according to an embodiment of the present disclosure; and FIG. 13 shows a schematic diagram of a structure of a display device according to an embodiment of the present disclosure.

DETAILED DESCRIPTION

Embodiments of the present disclosure will be described below with reference to the accompanying drawings.

Figure 1:
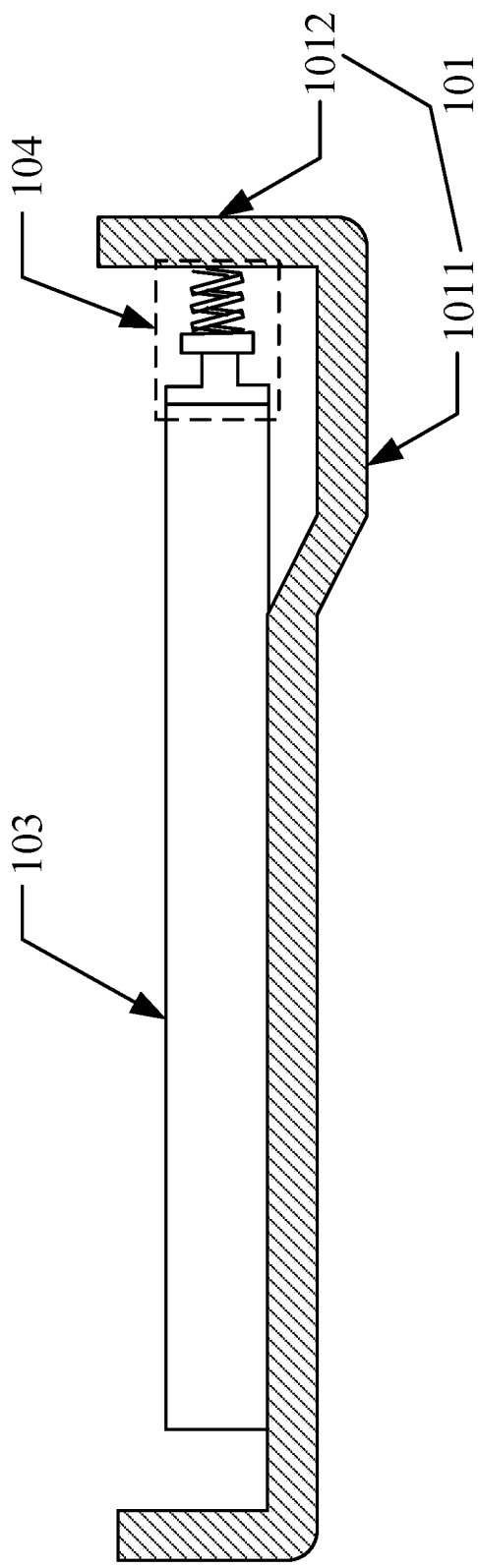
FIG. 1 shows a schematic diagram of a structure of a backlight module according to an embodiment of the present disclosure.

FIG. 1 shows a schematic diagram of a structure of a backlight module according to an embodiment of the present disclosure. As shown in FIG. 1, the backlight module includes: a back plate 101, a light guide plate 103 and at least one elastic mechanism 104.

The back plate 101 includes a base plate 1011 and a lateral plate 1012. The light guide plate 103 is stacked on the base plate 1011. The lateral plate 1012 is located outside a side surface of the light guide plate 103, which is a surface other than two relatively bigger surfaces (namely, an upper surface and a lower surface of the light guide plate 103 in FIG. 1) of the light guide plate 103.

The at least one elastic mechanism 104 is located between the side surface of the light guide plate 103 and the lateral plate 1012. Each elastic mechanism 104 is connected to the side surface of the light guide plate 103 and the lateral plate 1012.

An elastic extending direction of the elastic mechanism 104 may be perpendicular to the side surface connected to the light guide plate 103, the elastic mechanism 104.

In summary, according to the backlight module provided by the embodiment of the present disclosure, the elastic mechanism is disposed between the side surface of the light guide plate and the lateral plate of the back plate. The elastic mechanism can elastically extend and retract to adapt to the expansion amount of the light guide plate when the light guide plate is heated to expand. The elastic mechanism is connected to both the side surface of the light guide plate and the lateral plate, and thus the elastic mechanism can relatively better limit the light guide plate. Thus, the light guide plate can be prevented from moving in the backlight module while the reliability of the backlight module provided by the embodiment of the present disclosure is guaranteed. Therefore, the light-exiting quality of the backlight module is improved. Further, the display effect of the display device is improved. The elastic mechanism may be a spring operating mechanism.

Optionally, the backlight module provided by the embodiment of the present disclosure may be a side-type backlight module or a direct-type backlight module. The backlight module further includes a light-emitting unit that may include a light-emitting diode (LED).

Figure 2:
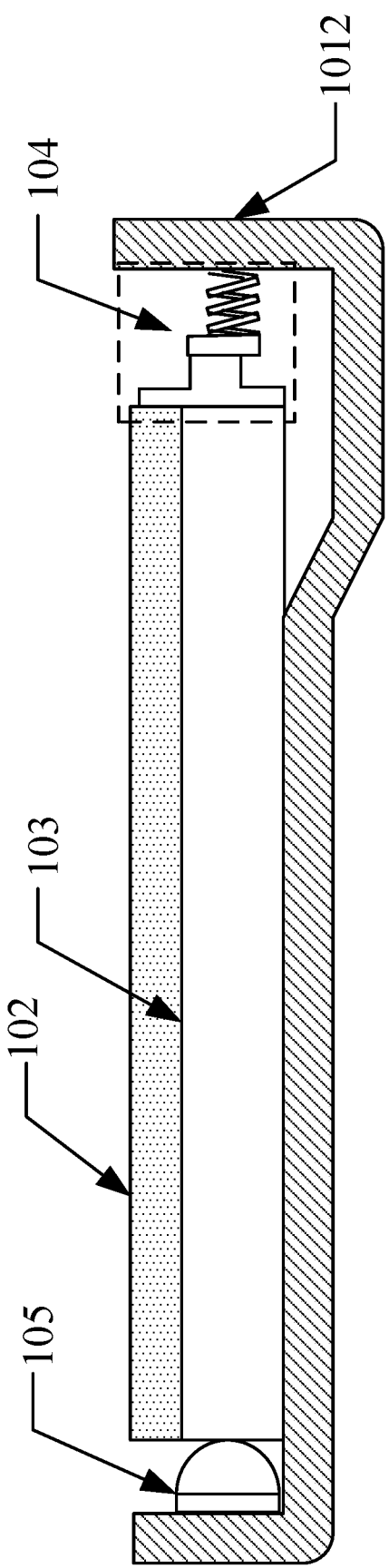
FIG. 2 shows a schematic diagram of a structure of a side-type backlight module according to an embodiment of the present disclosure.

FIG. 2 shows a schematic diagram of a structure of a side-type backlight module according to an embodiment of the present disclosure. As shown in FIG. 2, the light guide plate 103 has a plurality of side surfaces. A light-emitting unit 105 is on a first side surface (namely, a left side surface of the light guide plate 103 in FIG. 2) in the plurality of side surfaces of the light guide plate 103. The at least one elastic mechanism 104 is between at least one side surface other than the first side surface of the light guide plate 103 and the lateral plate 1012.

Optionally, the backlight module further includes an optical film material 102 located on a light-exiting side of the light guide plate 103. The light-exiting side is a side, which emits light, of the light guide plate, and may be a side (an upper side of the light guide plate in FIG. 2) where one of the two relatively bigger surfaces of the light guide plate is located.

Optionally, the elastic mechanism 104 is connected to a side surface of the optical film material 102. That is, the elastic mechanism 104 is connected to the side surface of the light guide plate and the side surface of the optical film material. The elastic mechanism and other parts (such as the light guide plate and the optical film material) may be in fixed connection (for example, by means of bonding) or movable connection (for example, by means of abutting).

Optionally, the light guide plate 103 is made from PMMA (organic glass) or silane-terminated polyether polymer (MS resin).

Figure 3:
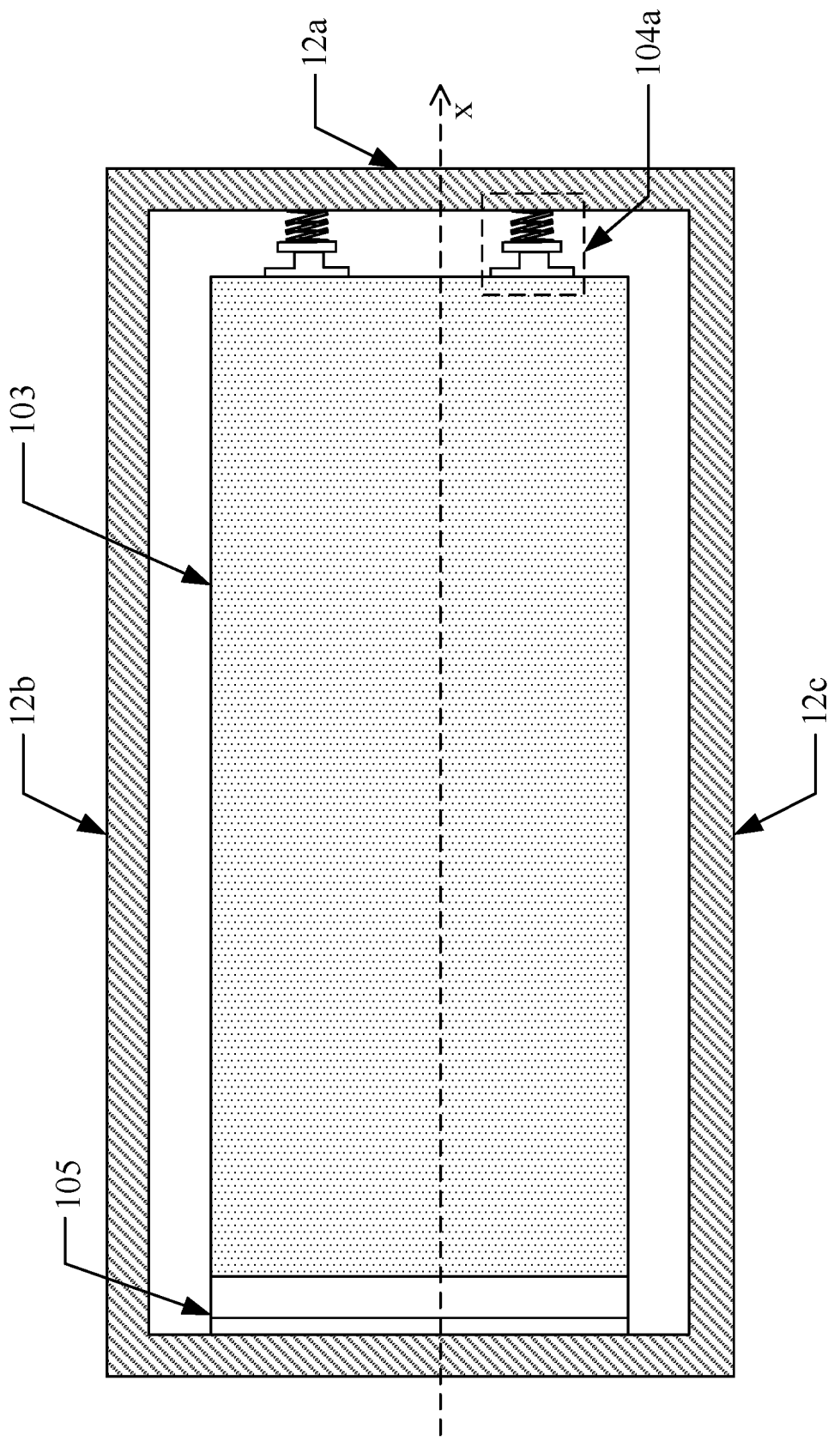
FIG. 3 shows a top view of a structure of a side-type backlight module according to an embodiment of the present disclosure.
Figure 4:
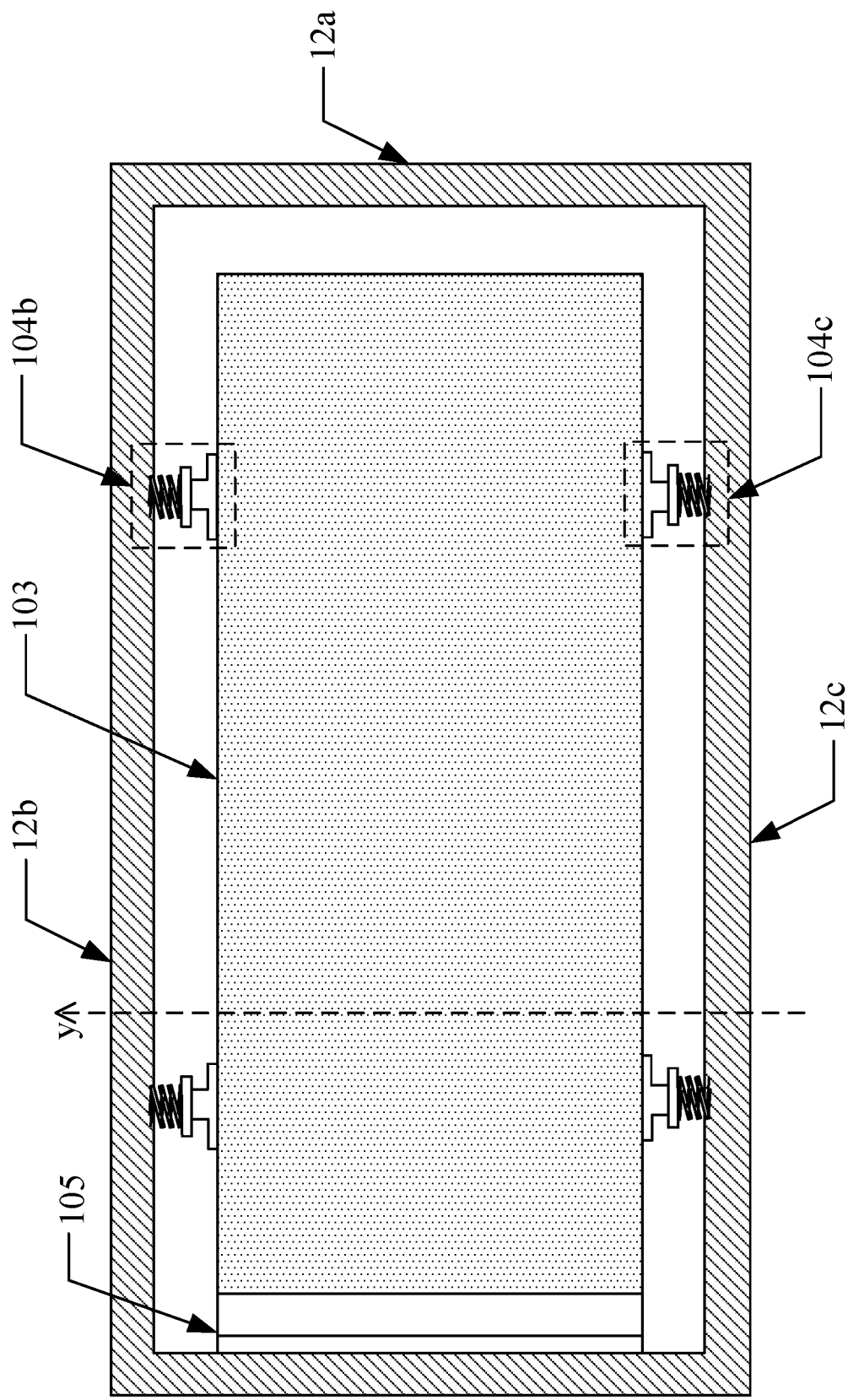
FIG. 4 shows a top view of a structure of another side-type backlight module according to an embodiment of the present disclosure.
Figure 5:
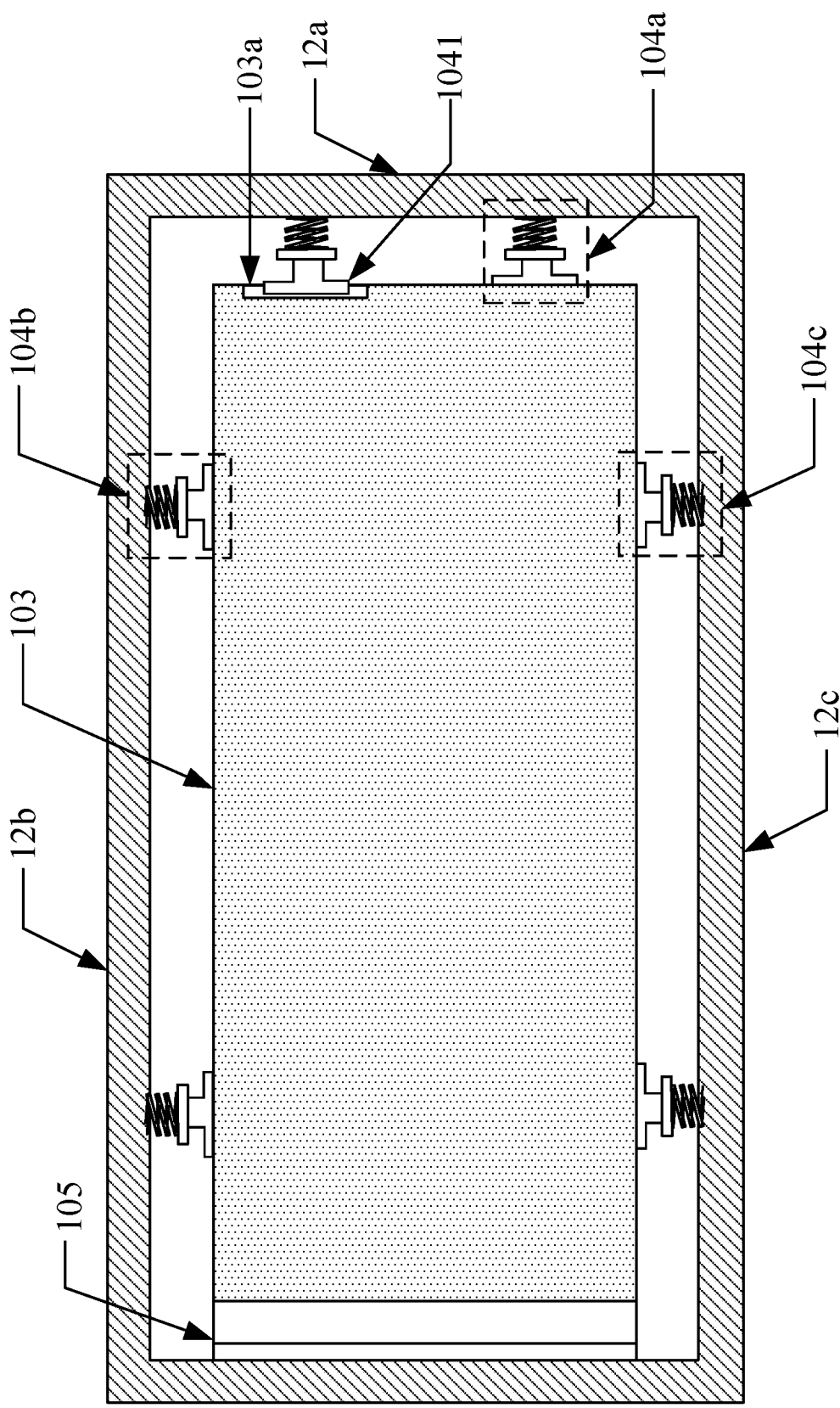
FIG. 5 shows a top view of a structure of yet another side-type backlight module according to an embodiment of the present disclosure.

Optionally, referring to FIGS. 3 to 5, the lateral plate of the back plate includes a first subsidiary lateral plate 12a, as well as a second subsidiary lateral plate 12b and a third subsidiary lateral plate 12c which are opposite to each other. The light guide plate 103 is a rectangular plate. The first subsidiary lateral plate 12a is opposite to a second side surface (namely, a right side surface in FIG. 3) of the light guide plate 103. The second subsidiary lateral plate 12b is opposite to a third side surface (namely, an upper side surface in FIG. 3) of the light guide plate 103. The third subsidiary lateral plate 12c is opposite to a fourth side surface (namely, a lower side surface in FIG. 3) of the light guide plate 103. The second side surface and the first side surface (namely, a left side surface in FIG. 3) of the light guide plate 103 are opposite to each other. The third side surface and the fourth side surface of the light guide plate 103 are adjacent to the first side surface. That is, the third side surface and the fourth side surface of the light guide plate 103 are opposite to each other.

FIG. 3 shows a top view of a structure of a side-type backlight module according to an embodiment of the present disclosure. As shown in FIG. 3, the at least one elastic mechanism includes a first elastic mechanism 104a between the second side surface of the light guide plate 103 and the first subsidiary lateral plate 12a.

Optionally, at least one first elastic mechanism may be disposed between the second side surface of the light guide plate 103 and the first subsidiary lateral plate. For example, referring to FIG. 3, two first elastic mechanisms 104a are disposed between the second side surface of the light guide plate 103 and the first subsidiary lateral plate 12a. The number of the elastic mechanisms disposed between the second side surface of the light guide plate and the first subsidiary lateral plate may be determined according to the dimension of the light guide plate or the dimension of the backlight module, which is not limited in the embodiment of the present disclosure.

By disposing the elastic mechanism between the second side surface of the light guide plate 103 and the first subsidiary lateral plate, the light-exiting surface of the light-emitting unit may fit the light-incident surface (namely, the first side surface) of the light guide plate, or the gap between the light-exiting surface of the light-emitting unit and the light-incident surface of the light guide plate is fixed. Thus, the first elastic mechanism may adapt to the expansion amount of the light guide plate in the elastic extending direction of the first elastic mechanism when the light guide plate is heated to expand. The optical luminance of the backlight module is affected by the gap between the light-incident surface of the light guide plate and the light-exiting surface of the light-emitting unit, and the smaller the gap is, the higher the optical luminance of the backlight module is. Therefore, the optical luminance of the backlight module can be improved when the light-exiting surface of the light-emitting unit and the light-incident surface of the light guide plate are attached to each other. Referring to FIG. 3, the first elastic mechanism may limit the light guide plate in a first direction x (the first direction x is perpendicular to the light-incident surface of the light guide plate), such that the light guide plate is prevented from moving along the first direction x, to cause change of the optical luminance of the backlight module. Thus, the light-exiting stability of the backlight module will not be affected. It can be known from above that the optical quality of the backlight module can be improved by disposing the elastic mechanism between the second side surface of the light guide plate and the first subsidiary lateral plate.

FIG. 4 shows a top view of a structure of another side-type backlight module according to an embodiment of the present disclosure. As shown in FIG. 4, the at least one elastic mechanism includes a second elastic mechanism 104b and a third elastic mechanism 104c. The second elastic mechanism 104b is disposed between the third side surface of the light guide plate 103 and the second subsidiary lateral plate 12b. The third elastic mechanism 104c is disposed between the fourth side surface of the light guide plate 103 and the third subsidiary lateral plate 12c.

Optionally, at least one second elastic mechanism may be disposed between the third side surface of the light guide plate and the second subsidiary lateral plate, and at least one third elastic mechanism may be disposed between the fourth side surface of the light guide plate and the third subsidiary lateral plate. For example, referring to FIG. 4, two second elastic mechanisms are disposed between the third side surface of the light guide plate 103 and the second subsidiary lateral plate 12b, and two third elastic mechanisms are disposed between the fourth side surface of the light guide plate 103 and the third subsidiary lateral plate 12c. The number of the elastic mechanisms disposed between the third side surface of the light guide plate and the second subsidiary lateral plate, and between the fourth side surface of the light guide plate and the third subsidiary lateral plate may be determined according to the dimension of the light guide plate or the dimension of the backlight module, which is not limited in the embodiment of the present disclosure.

By disposing the second elastic mechanism between the third side surface of the light guide plate 103 and the second subsidiary lateral plate, and disposing the third elastic between the fourth side surface of the light guide plate and the third subsidiary lateral plate, referring to FIG. 4, the light guide plate may be limited in a second direction y (the second direction y is parallel to the light-incident surface of the light guide plate). Thus, the light guide plate is prevented from moving along the second direction y, to cause the problem that the light-emitting unit cannot correspond to the lattice points on the light-exiting surface of the light guide plate, thereby causing the phenomena of hot spots (nonuniform illumination), edge light leakage, excessively bright edges or the like on the backlight module. The second elastic mechanism and the third elastic mechanism may adapt to the expansion amount of the light guide plate in the elastic extending direction of the second elastic mechanism and/or the third elastic mechanism when the light guide plate is heated to expand. It thus can be known that by disposing the elastic mechanism between the third side surface of the light guide plate and the second subsidiary lateral plate, and between the fourth side surface and the third subsidiary lateral plate, the optical quality of the backlight module can be improved while the reliability of the backlight module is ensured.

Optionally, the elasticity of the second elastic mechanism disposed between the third side surface of the light guide plate and the second subsidiary lateral plate equals that of the third elastic mechanism disposed between the fourth side surface of the light guide plate and the third subsidiary lateral plate. For example, the number of the second elastic mechanisms disposed between the third side surface of the light guide plate and the second subsidiary lateral plate equals that of the third elastic mechanisms disposed between the fourth side surfaces of the light guide plate and the third subsidiary lateral plate when the second elastic mechanisms and the third elastic mechanisms have equal elasticity (for example, their structures are completely identical). For example, the second elastic mechanisms and the third elastic mechanisms may be disposed in axial symmetry. Alternatively, when the elasticity of the selected second elastic mechanism is n times of that of the third elastic mechanism, the number of the second elastic mechanisms disposed between the third side surface of the light guide plate and the second subsidiary lateral plate is 1/n of that of the third elastic mechanisms disposed between the fourth side surface of the light guide plate and the third subsidiary lateral plate, and n is an integer greater than 1. It should be noted that deviation of the location of the light guide plate may be avoided to guarantee the optical quality of the backlight module when the second elastic mechanism disposed between the third side surface of the light guide plate and the second subsidiary lateral plate and the third elastic mechanism disposed between the fourth side surface of the light guide plate and the third subsidiary lateral plate have equal elasticity.

FIG. 5 shows a top view of a structure of yet another side-type backlight module according to an embodiment of the present disclosure. As shown in FIG. 5, the at least one elastic mechanism includes a first elastic mechanism 104a, a second elastic mechanism 104b and a third elastic mechanism 104c. The first elastic mechanism 104a is disposed between the second side surface of the light guide plate 103 and the first subsidiary lateral plate 12a. The second elastic mechanism 104b is disposed between the third side surface of the light guide plate 103 and the second subsidiary lateral plate 12b. The third elastic mechanism 104c is disposed between the fourth side surface of the light guide plate 103 and the third subsidiary lateral plate 12c.

Optionally, the number, location and beneficial effects of the first elastic mechanisms may be made reference to corresponding descriptions about FIG. 3, and the numbers, locations and beneficial effects of the second elastic mechanisms and the third elastic mechanisms may be made reference to corresponding descriptions about FIG. 4, which will not be repeated in the present embodiment of the present disclosure.

Figure 6:
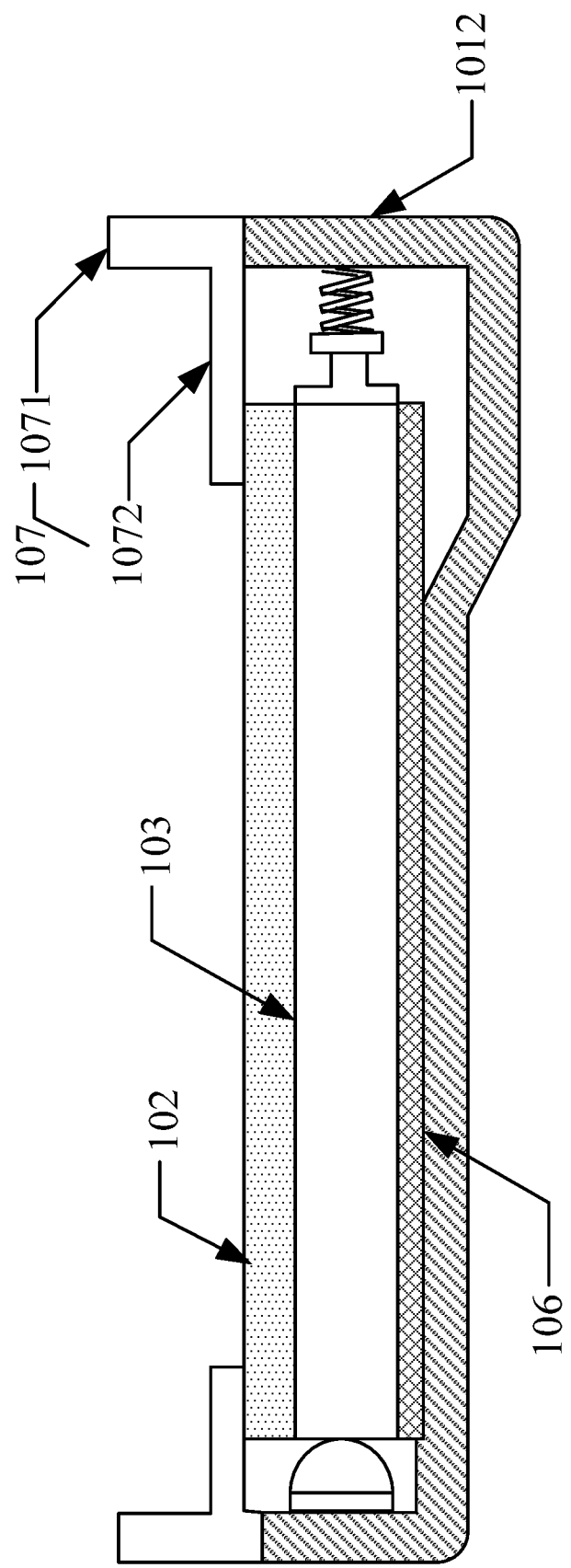
FIG. 6 shows a schematic diagram of a structure of yet another side-type backlight module according to an embodiment of the present disclosure.

Optionally, FIG. 6 shows a schematic diagram of a structure of yet another side-type backlight module according to an embodiment of the present disclosure. As shown in FIG. 6, the backlight module further includes a reflective sheet 106 and a plastic frame 107. The reflective sheet 106 is disposed on the side, away from the light-exiting side, of the light guide plate 103 and configured to reflect light that escapes from the side, away from the light-exiting side, of the light guide plate into the light guide plate, to improve the light-exiting efficiency of the backlight module. The plastic frame 107 is disposed on the side surface of the optical film material 102 and includes a strip-shaped frame 1071 and a strip-shaped extending structure 1072 located on a side surface of the strip-shaped frame 1071. The surface, away from the light guide plate 103, of the strip-shaped extending structure 1072 is configured to bear a display panel.

Figure 7:
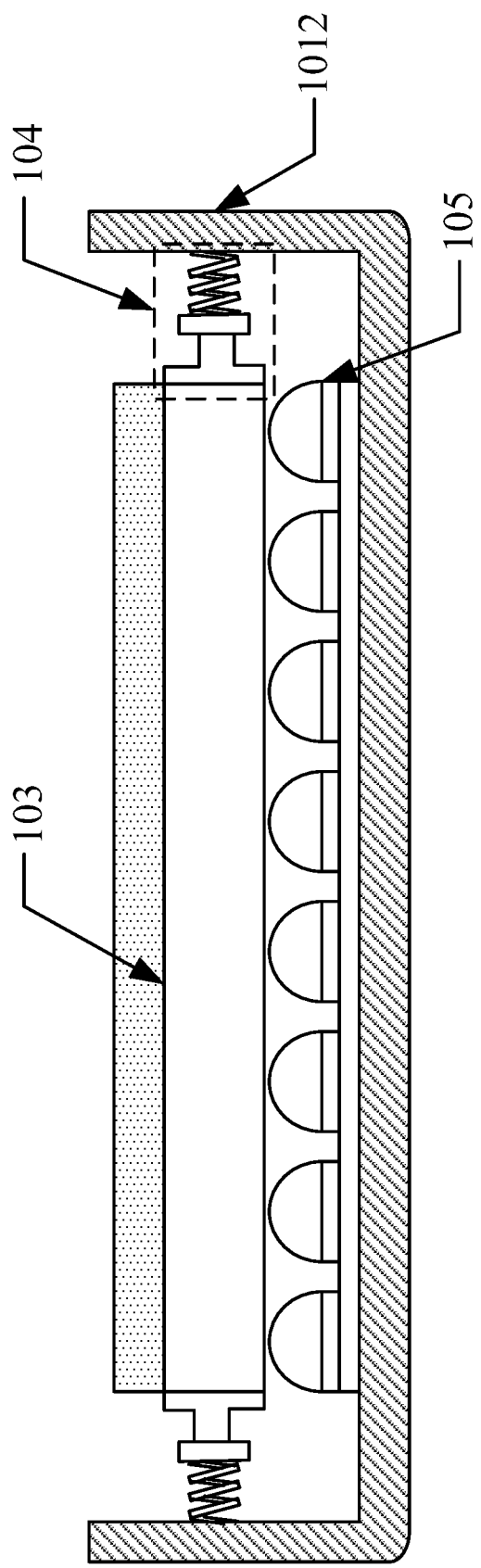
FIG. 7 shows a schematic diagram of a structure of a direct-type backlight module according to an embodiment of the present disclosure.

FIG. 7 shows a schematic diagram of a structure of a direct-type backlight module according to an embodiment of the present disclosure. As shown in FIG. 7, the light-emitting unit 102 is disposed on the side, opposite to the light-exiting side of the light guide plate 103. The lateral plates 1012 and the side surfaces of the light guide plate 103 are in one-to-one correspondence. The elastic mechanism 104 is disposed between each lateral plate 1012 and the corresponding side surface of the light guide plate 103.

Figure 8:
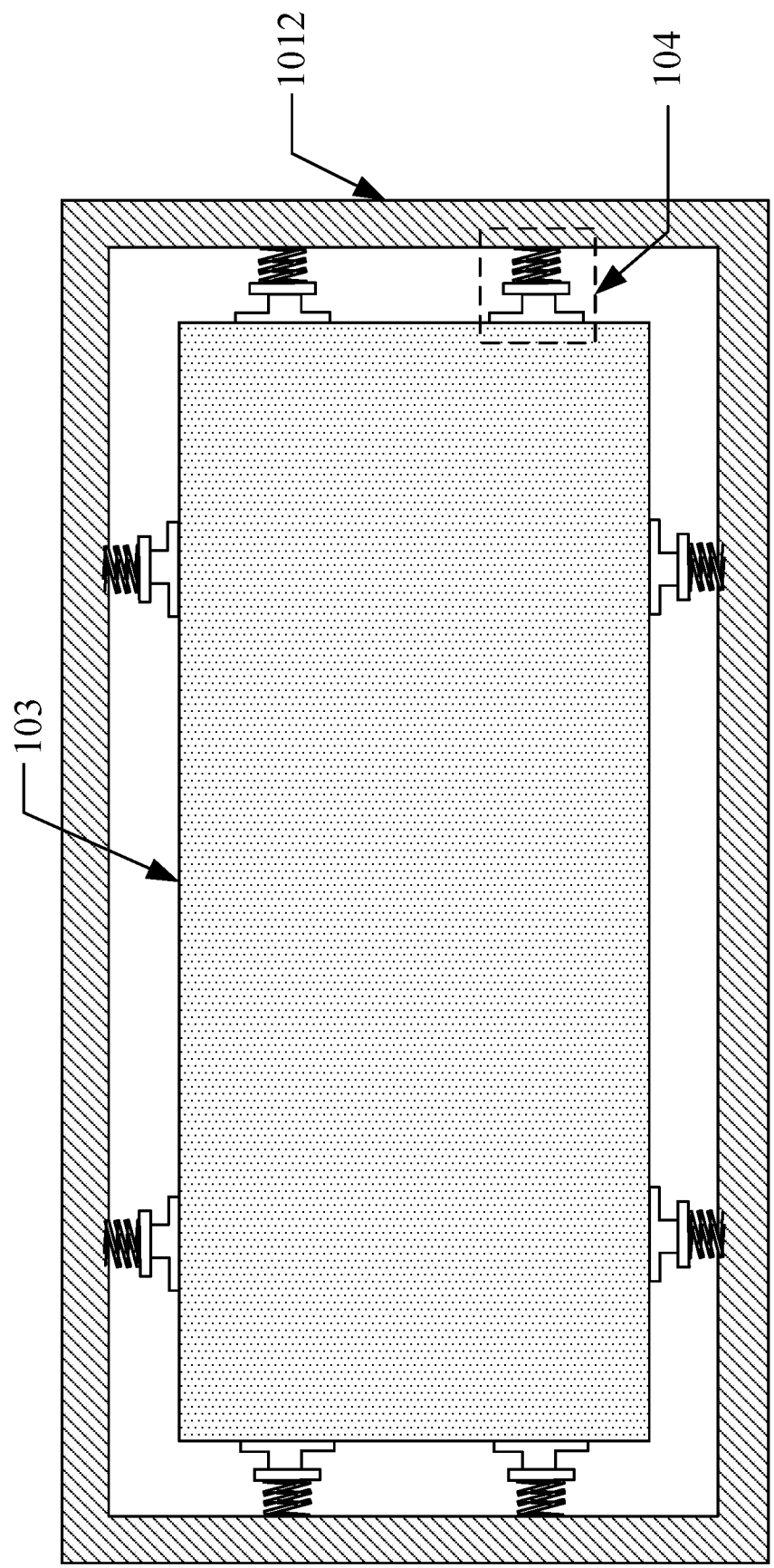
FIG. 8 shows a top view of a structure of a direct-type backlight module according to an embodiment of the present disclosure.

Optionally, FIG. 8 shows a top view of a structure of a direct-type backlight module according to an embodiment of the present disclosure. As shown in FIG. 8, at least one elastic mechanism 104 is disposed between each side surface of the light guide plate 103 and the corresponding lateral plate 1012.

It should be noted that by disposing the elastic mechanism between each side surface of the light guide plate and the corresponding lateral plate, the light guide plate may be limited in all directions. The elastic mechanisms disposed around the light guide plate may adapt to the expansion amount of the light guide plate when the light guide plate is heated to expand. Thus, the optical quality of the backlight module is improved while the reliability of the backlight module is ensured.

Optionally, the elastic mechanisms disposed between each of two opposite side surfaces of the light guide plate and the corresponding lateral plate have equal elasticity. Referring to corresponding descriptions about FIG. 4 for the relationship between the number and the elasticity of the elastic mechanisms disposed between each of two opposite side surfaces of the light guide plate and the corresponding lateral plate, which will not be repeated in the embodiment of the present disclosure. By enabling the elastic mechanisms disposed between each of two opposite side surfaces of the light guide plate and the corresponding lateral plate to have equal elasticity, deviation of the location of the light guide plate may be avoided, to guarantee the light-exiting stability of the backlight module.

Optionally, a stretching and retracting distance of the elastic mechanism used in the embodiment of the present disclosure is in a positive correlation with a linear expansion coefficient of the light guide plate. That is, the larger the linear expansion coefficient of the light guide plate used in the backlight module is, the larger the stretching and retracting distance of the used elastic mechanism is, and the larger an elastic limit of the elastic mechanism is. For example, the elastic limit F of the elastic mechanism satisfies the following formula: $F=ax+b$, in which a is a positive number, b is a constant and x is the linear expansion coefficient of the light guide plate. The elastic mechanism may be subject to elastic deformation within the elastic limit. Since the larger the linear expansion coefficient of the light guide plate is, the larger the expansion increment of the heated light guide plate is, and correspondingly, the larger the compression amount of the elastic mechanism is, the elastic mechanism of which the stretching and retracting distance is in a positive correlation with the linear expansion coefficient of the light guide plate may be used to relatively better adapt to the expansion amount of the light guide plate.

For example, the stretching and retracting distance of the used elastic mechanism may be greater than the maximum expansion amount of the light guide plate. The stretching and retracting distance of the used elastic mechanism being greater than the maximum expansion amount of the light guide plate means that the stretching and retracting distance of the elastic mechanism in a specified direction is greater than the maximum expansion amount of the light guide plate in the specified direction. The specified direction refers to the length extending direction or the width extending direction of the light guide plate.

For example, the linear expansion coefficient of the light guide plate made from PMMA is $6*10^{-5}$ mm/mm/° C. Assuming that a reliability test is performed within a temperature range from 25° C. to 60° C., when the length of the light guide plate in the specified direction is 300 mm, the maximum expansion amount of the length of the light guide plate in the specified direction is 0.63 mm, and the stretching and retracting distance of the at least one elastic mechanism in the specified direction is greater than 0.63 mm. For example, in the backlight module shown in FIG. 5, the first elastic mechanism has a stretching and retracting distance greater 0.63 mm when the specified direction is perpendicular to the light-incident surface of the light guide plate, and the sum of the stretching and retracting distances of the second elastic mechanism and the third elastic mechanism is greater than 0.63 mm when the specified direction is parallel to the light-incident surface of the light guide plate. For example, the stretching and retracting distance of the second elastic mechanism and the stretching and retracting distance of the third elastic mechanism are both greater than 0.315 mm. The maximum expansion amount of the length of the light guide plate in the specified direction is 1.26 mm when the length of the light guide plate in the specified direction is 600 mm. In this case, the stretching and retracting distance of the at least one elastic mechanism in the specified direction is more than 1.26 mm. By setting the stretching and retracting distance of the at least one elastic mechanism in the specified direction to be greater than the maximum expansion amount of the light guide plate in the specified direction, it ensures that the elastic mechanism can adapt to the expansion amount of the light guide plate in the specified direction. Thus, the reliability of the backlight module is ensured.

Figure 9:
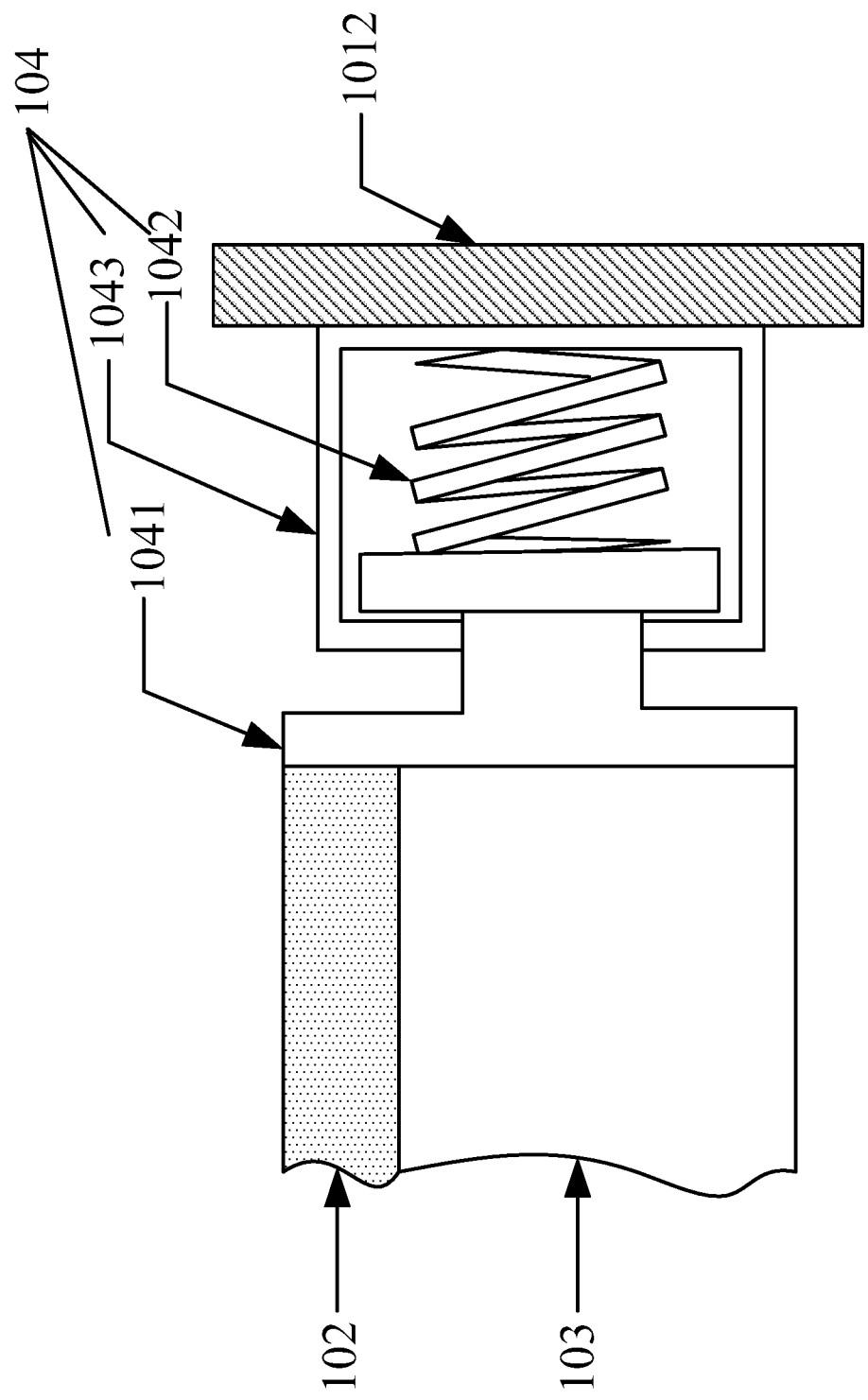
FIG. 9 shows a schematic diagram of a structure of an elastic mechanism according to an embodiment of the present disclosure.

Optionally, FIG. 9 shows a schematic diagram of a structure of an elastic mechanism according to an embodiment of the present disclosure. As shown in FIG. 9, the elastic mechanism 104 includes an ejection pin structure 1041 and an elastic element 1042. One end of the ejector pin structure 1041 abuts against the side surface of the light guide plate 103 and the side surface of the optical film material 102, and the other end thereof abuts against the elastic element 1042.

It should be noted that by enabling one end of the ejector pin structure to abut against the side surface of the light guide plate and the side surface of the optical film material, and the other end thereof to abut against the elastic element, the elastic element may be prevented from directly contact with the light guide plate and the optical film material, to cause damage to the light guide plate and/or the optical film material. Further, unfavorable picture display, such as white spots or white marks caused by chippings may be avoided.

Optionally, the elastic element includes at least one of a compression spring and a spring sheet, which is not limited in the embodiments of the present disclosure.

Optionally, as shown in FIG. 5, a notch 103a is in the side surface of the light guide plate 103. One end of the ejector pin structure 1041 abuts against the notch 103a. Since the ejector pin structure 1041 abuts against the notch 103a of the light guide plate 103, a role of stabilizing the light guide plate 103 played by the elastic mechanism 104 may be further improved.

FIG. 5 merely shows one notch 103a, but the amount of the notch is not limited thereto. That is, there may be a plurality of notches in the light guide plate 103, and the ejector pin structure 1041 of any elastic mechanism may abut against the notch in the light guide plate.

As shown in FIG. 9, the elastic mechanism 104 may further include an encapsulation housing 1043 fixedly connected to the lateral plate 1012. The elastic element 1042 is in the encapsulation housing 1043.

It should be noted that the elastic element is packaged in the encapsulation housing such that the elastic element may be prevented from directly contact with the lateral plate, to damage the lateral late. Thus, unfavorable picture display, such as white spots, white marks or the like may be avoided.

Optionally, the encapsulation housing and the lateral plate are in a press-rivet connection or threaded connection.

Figure 10:
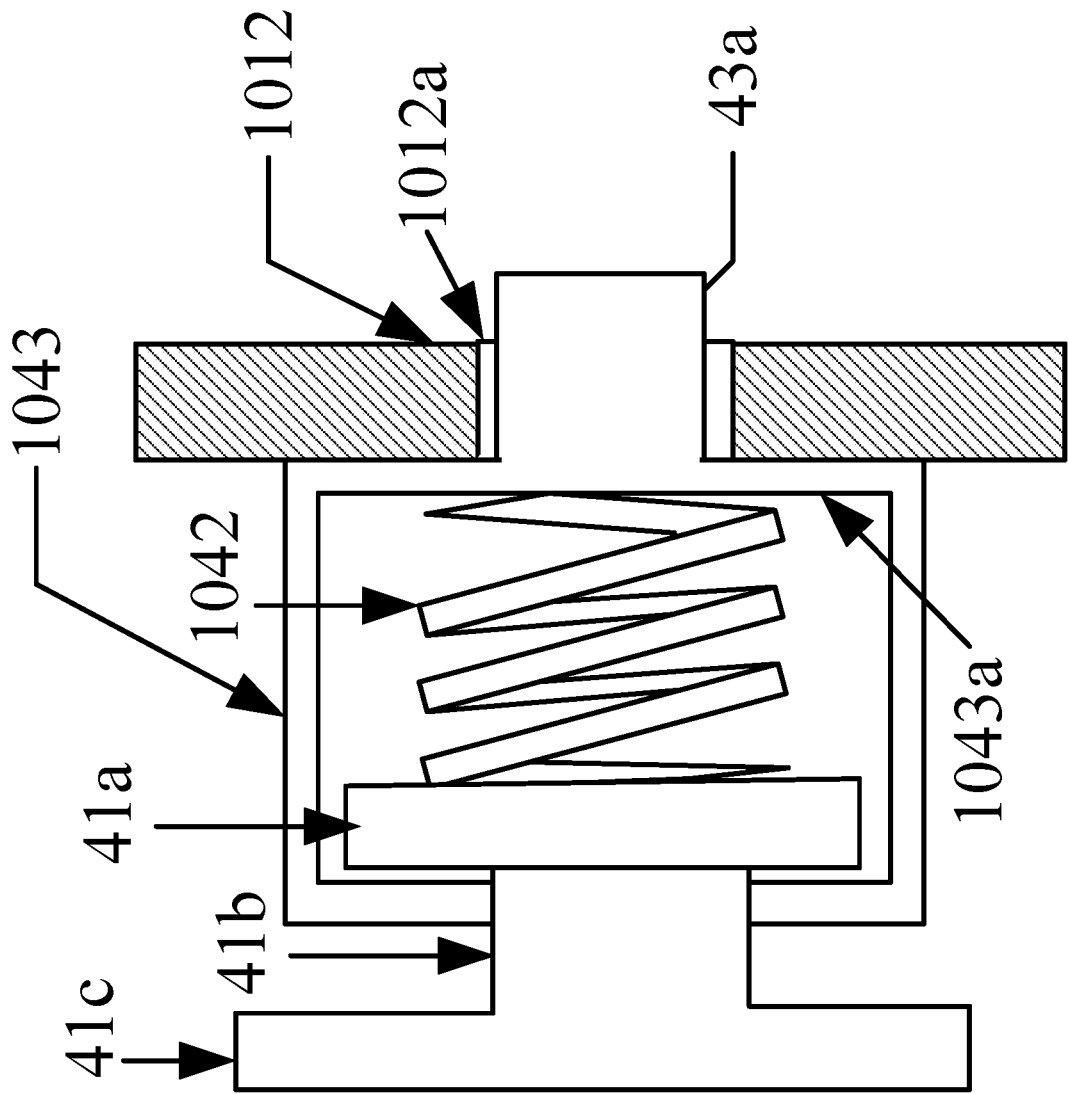
FIG. 10 shows a schematic diagram illustrating a connection between an encapsulation housing and a lateral plate according to an embodiment of the present disclosure.

For example, FIG. 10 shows a schematic diagram illustrating connection between a encapsulation housing and a lateral plate according to an embodiment of the present disclosure. As shown in FIG. 10, a screw thread structure 43a is disposed on the encapsulation housing 1043 and is pressed into the lateral plate 1012, to realize a fixed connection between the encapsulation housing and the lateral plate.

Optionally, the lateral plate 1012 is provided with a through hole 1012a, to which the encapsulation housing 1043 is fixedly connected.

The ejector pin structure 1041 includes a bearing portion 41a, a connecting rod 41b and a pushing and pressing portion 41c. The bearing portion 41a and the pushing and pressing portion 41c are connected to two ends of the connecting rod 41b, respectively. The bearing portion 41a is in the encapsulation housing 1043 and connected to the elastic element 1042. The pushing and pressing portion 41c abuts against the side surface of the light guide plate.

A bearing wall 1043a is inside the encapsulation housing 1043. One end of the elastic element 1042 abuts against the bearing wall 1043a, and the other end thereof abuts against the bearing portion 41a.

Figure 11:
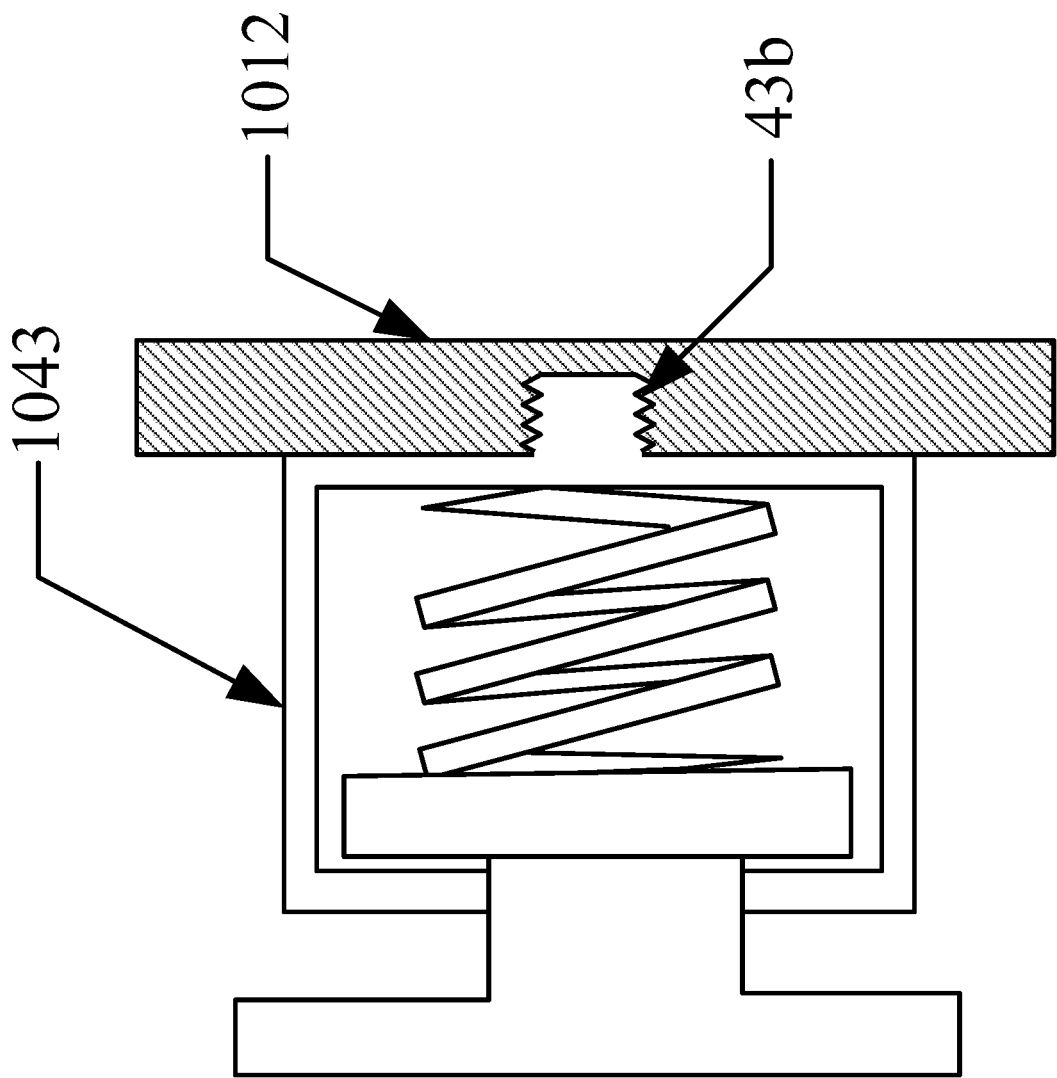
FIG. 11 shows a schematic diagram illustrating another connection between an encapsulation housing and a lateral plate according to an embodiment of the present disclosure.

For example, FIG. 11 shows another schematic diagram illustrating connection between a encapsulation housing and a lateral plate according to an embodiment of the present disclosure. As shown in FIG. 11, a threaded structure 43b is disposed on the encapsulation housing 1043. An open slot is in the lateral plate 1012. An internal threaded structure is disposed on an inner wall of the open slot. The threaded structure 43b on the encapsulation housing 1043 is screwed into the open slot in the lateral plate 1012, to realize a fixed connection between the encapsulation housing and the lateral plate.

Optionally, the encapsulation housing is made of metal. The encapsulation housing and the lateral plate may also be fixedly connected by means of welding, clamping or the like, which is not limited in the embodiments of the present disclosure.

As shown in FIG. 12 which shows yet another schematic diagram of connection between a encapsulation housing and a lateral plate according to an embodiment of the present disclosure, a through hole (not shown in FIG. 12) is in the lateral plate 1012. The encapsulation housing 1043 wholly passes through the through hole and is fixedly connected to the lateral plate 1012 through the through hole.

In summary, in the backlight module provided in the embodiments of the present disclosure, the elastic mechanism is between the side surface of the light guide plate and the lateral plate of the back plate. The elastic mechanism can stretch and retract elastically to adapt to the expansion amount of the light guide plate when the light guide plate is heated to expand. As one end of the elastic mechanism abuts against the side surface of the light guide plate, and the other end thereof abuts against the lateral plate, the elastic mechanism can limit the light guide plate relatively better. Compared with the related art, the backlight module provided in the embodiments of the present disclosure can prevent the light guide plate from moving in the backlight module while guaranteeing the reliability of the backlight module. Thus, the light exiting quality of the backlight module is improved, thereby improving the display effect of the display device.

FIG. 13 shows a schematic diagram of a structure of a display device according to an embodiment of the present disclosure. The display device includes a display panel 20 and the backlight module 10 shown in any of FIG. 1 to FIG. 8 (The reference signs of parts in the backlight module 10 may be made reference to FIG. 10).

In summary, in the display device provided in the embodiments of the present disclosure, the elastic mechanism is between the side surface of the light guide plate and the lateral plate of the back plate. The elastic mechanism can stretch and retract elastically to adapt to the expansion amount of the light guide plate when the light guide plate is heated to expand. As one end of the elastic mechanism abuts against the side surface of the light guide plate, and the other end thereof abuts against the lateral plate, the elastic mechanism can limit the light guide plate relatively better. Compared with the related art, the backlight module provided in the embodiments of the present disclosure can prevent the light guide plate from moving in the backlight module while the guaranteeing the reliability of the backlight module. Thus, the light exiting quality of the backlight module is improved, thereby improving the display effect of the display device.

An embodiment of the present disclosure further provides a terminal, which includes the display device shown in FIG. 13. The terminal may be any product or part with a display function, such as a liquid crystal display, a mobile phone, a tablet PC, a television, a laptop, a digital photo frame or a navigator.

The above descriptions are merely optional embodiments of the present disclosure, and are not intended to limit the present disclosure. Any modifications, equivalent substitutions, improvements, etc. made within the spirit and principles of the present disclosure should be included in the scope of protection of the present disclosure.

In the embodiments of the present disclosure, in an aspect, there is provided a backlight module, including:

a back plate, an optical film material, a light guide plate and at least one elastic mechanism.

The back plate includes a base plate and a lateral plate on at least one side of the base plate. The optical film material is on a light-exiting side of the light guide plate that is disposed between the optical film material and the base plate.

The elastic mechanism is disposed between a side surface of the light guide plate and the lateral plate. One end of the elastic mechanism abuts against the side surface of the light guide plate, and the other end thereof abuts against the lateral plate.

Optionally, the backlight module is a side-type backlight module and further includes a light-emitting unit disposed on a first side surface of the light guide plate.

The elastic mechanism is disposed between at least one side surface other than the first side surface of the light guide plate and the lateral plate.

Optionally, the at least one elastic mechanism includes a first elastic mechanism. The lateral plate includes a first subsidiary lateral plate.

The first elastic mechanism is disposed between a second side surface of the light guide plate and the first subsidiary lateral plate. The second side surface is opposite to the first side surface.

Optionally, the at least one elastic mechanism includes a second elastic mechanism and a third elastic mechanism. The lateral plate further includes a second subsidiary lateral plate and a third subsidiary lateral plate which are opposite to each other.

The second elastic mechanism is between a third side surface of the light guide plate and the second subsidiary lateral plate. The third elastic mechanism is disposed between a fourth side surface of the light guide plate and the third subsidiary lateral plate. The third side surface and the fourth side surface are adjacent to the first side surface.

Optionally, the backlight module is a direct-type backlight module. The lateral plates and the side surfaces of the light guide plate are in one-to-one correspondence. The elastic mechanism is disposed between each lateral plate and the corresponding side surface.

Optionally, the elastic mechanism includes an ejector pin structure and an elastic element.

One end of the ejector pin structure abuts against the side surface of the light guide plate and the side surface of the optical film material, and the other end thereof abuts against the elastic element.

Optionally, the elastic mechanism further includes an encapsulation housing fixedly connected to the lateral plate. The elastic element is in the encapsulation housing.

Optionally, the encapsulation housing and the lateral plate are in a press-rivet connection or threaded connection.

Optionally, the elastic element includes at least one of a compression spring and a spring sheet.

Optionally, a stretching and retracting distance of the elastic mechanism and a linear expansion coefficient of the light guide plate are in positive correlation.

Optionally, the stretching and retracting distance of the at least one elastic mechanism is more than a maximum expansion amount of the light guide plate.

In another aspect, there is provided a display device, including any backlight module described in the above aspect.

The technical solutions provided in the embodiments of the present disclosure have the following benefits.

By disposing the elastic mechanism between the side surface of the light guide plate and the lateral plate of the back plate, the elastic mechanism can expand and contract elastically to adapt to the expansion amount of the light guide plate when the light guide plate is heated to expand. As one end of the elastic mechanism abuts against the side surface of the light guide plate, and the other end thereof abuts against the lateral plate, the elastic mechanism can limit the light guide plate relatively better. Compared with the related art, the backlight module provided in the embodiments of the present disclosure can prevent the light guide plate from moving in the backlight module while guaranteeing the reliability of the backlight module. Thus, the light exiting quality of the backlight module is improved, thereby improving the display effect of the display device.

What is claimed is:

1. A backlight module, comprising a back plate, a light guide plate and at least one elastic mechanism; wherein
the back plate comprises a base plate and a lateral plate, the light guide plate being stacked on the base plate, and the lateral plate being outside a side surface of the light guide plate, the side surface of the light guide plate being a surface other than two relatively bigger surfaces of the light guide plate;
the at least one elastic mechanism is between the side surface of the light guide plate and the lateral plate, and each elastic mechanism is connected to the side surface of the light guide plate and the lateral plate; and
each elastic mechanism comprises an ejector pin structure and an elastic element;
wherein one end of the ejector pin structure abuts against the side surface of the light guide plate, and the other end of the ejector pin structure is connected to the elastic element.

2. The backlight module according to claim 1, comprising a light-emitting unit, wherein the light guide plate has a plurality of side surfaces, and the light-emitting unit is on a first side surface in the plurality of side surfaces of the light guide plate; and
the at least one elastic mechanism is between side surfaces other than the first side surface of the light guide plate and the lateral plate.

3. The backlight module according to claim 2, wherein the at least one elastic mechanism comprises a first elastic mechanism, and the lateral plate comprises a first subsidiary lateral plate;
wherein the first elastic mechanism is between a second side surface of the light guide plate and the first subsidiary lateral plate, the second side surface being opposite to the first side surface.

4. The backlight module according to claim 2, wherein the plurality of side surfaces of the light guide plate comprises a third side surface and a fourth side surface that are adjacent to the second side surface;
a number of the elastic mechanisms is at least three, the at least three elastic mechanisms further comprise a second elastic mechanism and a third elastic mechanism, and the lateral plate comprises a second subsidiary lateral plate and a third subsidiary lateral plate;
wherein the second elastic mechanism is between the third side surface of the light guide plate and the second subsidiary lateral plate, and the third elastic mechanism is between the fourth side surface of the light guide plate and the third subsidiary lateral plate.

5. The backlight module according to claim 1, further comprising a light-emitting unit between the light guide plate and the back plate;
wherein the light guide plate comprises a plurality of side surfaces, the elastic mechanism is between each of the side surfaces and the lateral plate.

6. The backlight module according to claim 1, further comprising an optical film material on a light-exiting side of the light guide plate;
wherein the elastic mechanism is connected to a side surface of the optical film material, the side surface of the optical film material being a surface other than two relatively bigger surfaces of the optical film material.

7. The backlight module according to claim 1, comprising a light-emitting unit, wherein the light guide plate is provided with a plurality of side surfaces, the light-emitting unit being on a first side surface in the plurality of side surfaces of the light guide plate;
the at least one elastic mechanism is between side surfaces other than the first side surface of the light guide plate and the lateral plate;
the at least one elastic mechanism comprises a first elastic mechanism, and the lateral plate comprises a first subsidiary lateral plate;
the first elastic mechanism is between a second side surface of the light guide plate and the first subsidiary lateral plate, the second side surface being opposite to the first side surface;
the light guide plate is a rectangular plate, and the plurality of side surfaces of the light guide plate comprises a third side surface and a fourth side surface that are adjacent to the second side surface;
a number of the elastic mechanisms is at least three; the at least three elastic mechanisms comprise a second elastic mechanism and a third elastic mechanism, and the lateral plate comprises a second subsidiary lateral plate and a third subsidiary lateral plate; and
the second elastic mechanism is between the third side surface of the light guide plate and the second subsidiary lateral plate, and the third elastic mechanism is between the fourth side surface of the light guide plate and the third subsidiary lateral plate.

8. The backlight module according to claim 1, wherein a notch is in the side surface of the light guide plate, the one end of the ejector pin structure abutting against the notch.

9. The backlight module according to claim 1, wherein the elastic mechanism further comprises an encapsulation housing, the elastic element being in the encapsulation housing and the encapsulation housing being fixedly connected to the lateral plate.

10. The backlight module according to claim 9, wherein the encapsulation housing and the lateral plate are in a press-rivet connection or threaded connection.

11. The backlight module according to claim 9, wherein the lateral plate is provided with a through hole, the encapsulation housing being fixedly connected to the through hole; and the ejector pin structure comprises a bearing portion, a connecting rod and a pushing and pressing portion, wherein the bearing portion and the pushing and pressing portion are connected to two ends of the connecting rod, respectively, the bearing portion is inside the encapsulation housing and connected to the elastic element, and the pushing and pressing portion abuts against the side surface of the light guide plate.

12. The backlight module according to claim 1, wherein the elastic element comprises at least one of a compression spring and a spring sheet.

13. A display device, comprising a backlight module, wherein the backlight module comprises a back plate, a light guide plate and at least one elastic mechanism, wherein the back plate comprises a base plate and a lateral plate, the light guide plate being stacked on the base plate, and the lateral plate being outside a side surface of the light guide plate, the side surface of the light guide plate being a surface other than two relatively bigger surfaces of the light guide plate;

the at least one elastic mechanism is between the side surface of the light guide plate and the lateral plate, and each elastic mechanism is connected to the side surface of the light guide plate and the lateral plate; and each elastic mechanism comprises an ejector pin structure and an elastic element;

wherein one end of the ejector pin structure abuts against the side surface of the light guide plate, and the other end of the ejector pin structure is connected to the elastic element.

14. The display device according to claim 13, wherein the backlight module comprises a light-emitting unit, and the light guide plate is provided with a plurality of side surfaces, the light-emitting unit being on a first side surface in the plurality of side surfaces of the light guide plate;

wherein the at least one elastic mechanism is between side surfaces other than the first side surface of the light guide plate and the lateral plate;

the at least one elastic mechanism comprises a first elastic mechanism, and the lateral plate comprises a first subsidiary lateral plate;

the first elastic mechanism is between a second side surface of the light guide plate and the first subsidiary lateral plate, the second side surface being opposite to the first side surface;

the light guide plate is a rectangular plate, and the plurality of side surfaces of the light guide plate comprises a third side surface and a fourth side surface that are adjacent to the second side surface;

a number of the elastic mechanisms is at least three, the at least three elastic mechanisms comprise a second elastic mechanism and a third elastic mechanism, and the lateral plate comprises a second subsidiary lateral plate and a third subsidiary lateral plate; and the second elastic mechanism is between the third side surface of the light guide plate and the second subsidiary lateral plate, and the third elastic mechanism is between the fourth side surface of the light guide plate and the third subsidiary lateral plate.

15. A terminal, comprising a display device, the display device comprising a backlight module, wherein the backlight module comprises a back plate, a light guide plate and at least one elastic mechanism;

wherein the back plate comprises a base plate and a lateral plate, the light guide plate being stacked on the base plate, and the lateral plate being outside a side surface of the light guide plate, the side surface of the light guide plate being a surface other than two relatively bigger surfaces of the light guide plate;

the at least one elastic mechanism is between the side surface of the light guide plate and the lateral plate, and each elastic mechanism is connected to the side surface of the light guide plate and the lateral plate; and each elastic mechanism comprises an ejector pin structure and an elastic element;

wherein one end of the ejector pin structure abuts against the side surface of the light guide plate, and the other end of the ejector pin structure is connected to the elastic element.

* * * * *